United States Patent
Chao et al.

(10) Patent No.: US 6,196,347 B1
(45) Date of Patent: Mar. 6, 2001

(54) POWER TRANSMISSION AND PEDAL FORCE SENSING SYSTEM FOR AN ELECTRIC BICYCLE

(75) Inventors: Chin-Yu Chao; Chih-Jin Wang, both of Tainan; Yin-Jao Luo, Hsinchu; Yuh-Wen Hwang, Tainan, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/157,960

(22) Filed: Sep. 22, 1998

(51) Int. Cl.[7] .................................................. B62M 7/02
(52) U.S. Cl. ............................................. 180/206; 180/220
(58) Field of Search ...................................... 180/205, 206, 180/207, 220, 65.1, 65.6, 65.8, 230; 475/1, 4, 5, 338; 73/862.195, 862.321

(56) References Cited

U.S. PATENT DOCUMENTS

| | | | |
|---|---|---|---|
| 4,044,851 | * 8/1977 | Shaw et al. | 180/206 |
| 4,393,954 | * 7/1983 | Soucy et al. | 180/205 |
| 4,541,500 | * 9/1985 | Gelhard | 180/205 |
| 4,569,234 | * 2/1986 | F'Geppert | 73/862.195 |
| 4,966,380 | * 10/1990 | Mercat | 73/862.195 |
| 5,242,336 | * 9/1993 | Hori | 475/338 |
| 5,704,441 | * 1/1998 | Li | 180/206 |
| 5,910,066 | * 6/1999 | Schulz et al. | 475/338 |
| 6,012,538 | * 1/2000 | Sonobe et al. | 180/220 |

FOREIGN PATENT DOCUMENTS

| | | | |
|---|---|---|---|
| 424820 | * 2/1935 | (GB) | 180/220 |
| 2256025 | * 11/1992 | (GB) | 475/338 |
| 7600586 | * 8/1976 | (NL) | 180/206 |
| 89/08579 | * 9/1989 | (WO) | 180/206 |

* cited by examiner

*Primary Examiner*—Frank Vanaman

(57) ABSTRACT

A power transmission and pedal force sensing system for an electric motor includes an electric motor, a gear reduction train, a pedal force sensing system, and a power combination mechanism. These four mechanisms are concentrically, closely mounted in a single casing. The pedal force sensing system includes a pedal force transmitting sleeve having an elastic device mounted therein, and a pedal force sensing sleeve mounted outside the pedal force transmission path for converting the pedal force into an axial displacement. A proximity sensor is used to detect the axial displacement and outputs a voltage signal representing the magnitude of the pedal force. The power transmission path is shortened and only one casing is required to house all of the elements to thereby obtain a structure of a higher transmission efficiency and reduced volume and weight.

19 Claims, 7 Drawing Sheets voltage

1v

0 FIG.8a time voltage

3v

0 FIG.8b time

POWER TRANSMISSION AND PEDAL FORCE SENSING SYSTEM FOR AN ELECTRIC BICYCLE

BACKGROUND OF THE INVENTION

1. Field of the Invention

The present invention relates to an electric bicycle, and more particularly to a power transmission and pedal force sensing system for an electric bicycle.

2. Description of the Related Art

A conventional electric bicycle generally comprises a high speed electric motor used as an auxiliary power source, a gear reduction mechanism for reducing speed of the motor and increasing the output torque, and a power combining mechanism for combining the power from the motor after speed reduction and the pedaling power from the cyclist for subsequent transmission to a chain wheel for driving the electric bicycle at a labor-saving mode. A pedal force sensor is provided on a pedal force transmission path to detect the magnitude of the pedal force to thereby control auxiliary output power from the electric motor.

A transmission mechanism for the above conventional electric bicycle includes a frame mounted adjacent to a crankshaft of a bicycle and including a main casing and an auxiliary casing arranged in a direction perpendicular to the main casing. The power combining mechanism and the pedal force sensing mechanism are mounted in the main casing, while the electric motor and the gear reduction mechanism are mounted in the auxiliary casing. Bevel gears are used for transmission. Such a transmission mechanism has a low transmission efficiency as there are too many stages for gear reduction and the transmission path is too long. In addition, the electric motor is not mounted inside the main casing such that additional supporting casing and transmission elements are required, and this results in a bulky structure. Further, the sensing system adopts a bolt and nut or plane cam to convert relative angular displacement into axial displacement, which, in turn, is detected by a proximity sensor for outputting a signal corresponding to a magnitude of the pedal force. Yet, the elements of the pedal sensing system are located on the pedal force transmission path and are thus liable to wear.

The present invention is intended to provide a power transmission and pedal force sensing system that mitigates and/or obviates the drawbacks of the above conventional electric bicycle.

SUMMARY OF THE INVENTION

It is a primary object of the present invention to provide a power transmission and pedal force sensing system for an electric bicycle, in which the power transmission path is shortened and the transmission efficiency is improved.

It is a further object of the present invention to provide a power transmission and pedal force sensing system for an electric bicycle that has a smaller volume and a lower weight.

It is another object of the present invention to provide a power transmission and pedal force sensing system for an electric bicycle to reduce friction between elements.

In order to effectively solve the drawbacks of the conventional transmission design and to achieve the above-mentioned objects, the present invention provides a power transmission system and a pedal sensing system. In accordance with the present invention, a casing is mounted to the crankshaft for housing an electric motor, a gear reduction train, a pedal force sensing system, and a power combination mechanism. These four mechanisms are concentrically, closely mounted in the single casing.

The power transmission system for an electric motor of the present invention comprises a casing, a crankshaft for pedals extended through the casing, a hollow axle mounted around the crankshaft, and a motor hollow shaft mounted around the hollow axle. A left part of the motor hollow axle is connected to an electric motor, and a right part of the motor hollow axle is connected to an input gear of a gear reduction train. The gear reduction train is preferably a Ferguson's mechanical paradox gear that has a high gear reduction ratio. An output gear of the gear reduction ratio is connected to an outer periphery of an enlarged hollow end of the hollow axle via a first single direction clutch of the power combination mechanism. An inner periphery of the enlarged end of the hollow axle and the crankshaft together define a space therebetween for receiving a pedal force sensing system. The pedal force sensing system includes a pedal force transmitting sleeve that has an inner ring securely mounted around the crankshaft to rotate therewith and an outer ring connected to the inner periphery of the enlarged end of the hollow axle via a second single direction clutch of the power combination mechanism. The first single direction clutch and the second single direction clutch are mounted to the outer periphery and inner periphery of the enlarged end of the hollow axle along a radial direction. The other end of the hollow axle is securely connected to a chain wheel to rotate therewith. Thus, the pedal force is transmitted to the hollow axle via the crankshaft, the pedal force transmitting force of the pedal force sensing system, and the second single direction clutch to thereby drive the chain wheel and the bicycle frame. The power from the electric motor is transmitted to the hollow axle via the motor hollow shaft, the gear reduction train, and the first single direction clutch to thereby drive the chain wheel and the bicycle frame. By such an arrangement, the power transmission path is shortened and thus has a higher transmission efficiency. In addition, the electric motor is housed in the casing such that the overall volume and the overall weight are both reduced.

In the pedal force sensing system, an elastic means is provided between the inner ring and the outer ring of the pedal force transmitting sleeve. A pedal force sensing sleeve is mounted adjacent to the pedal force transmitting sleeve and includes a square key groove so as to be securely mounted on the crankshaft. In addition, at leas tone plane cam is provided on one side of the pedal force sensing sleeve that faces the pedal force transmitting sleeve. When pedaling, the crankshaft drives the inner ring of the pedal force transmitting sleeve and thus exerts a force on the outer ring of the pedal force transmitting sleeve such that the elastic means between the inner ring and the outer ring deforms. As a result, a relative angular displacement occurs between the inner ring and the outer ring. Namely, the pedal force sensing sleeve and the outer ring of the pedal force transmitting sleeve have a relative angular displacement therebetween. This relative angular displacement causes axial displacement of the pedal force sensing sleeve, and a proximity sensor is used to detect the axial displacement and outputs a voltage signal representing the magnitude of the pedal force. Friction between the elements is eliminated, as the elements of the pedal force sensing system are not located on the pedal force transmission path.

Other objects, advantages, and novel features of the invention will become more apparent from the following detailed description when taken in conjunction with the accompanying drawings.

BRIEF DESCRIPTION OF THE DRAWINGS

FIG. 8a is a voltage/time diagram of an output of the analog type Hall element in FIG. 7a;

FIG. 8b is a voltage/time diagram of an output of the analog type Hall element in FIG. 7b;

DETAILED DESCRIPTION OF THE PREFERRED EMBODIMENT

Figure 1:
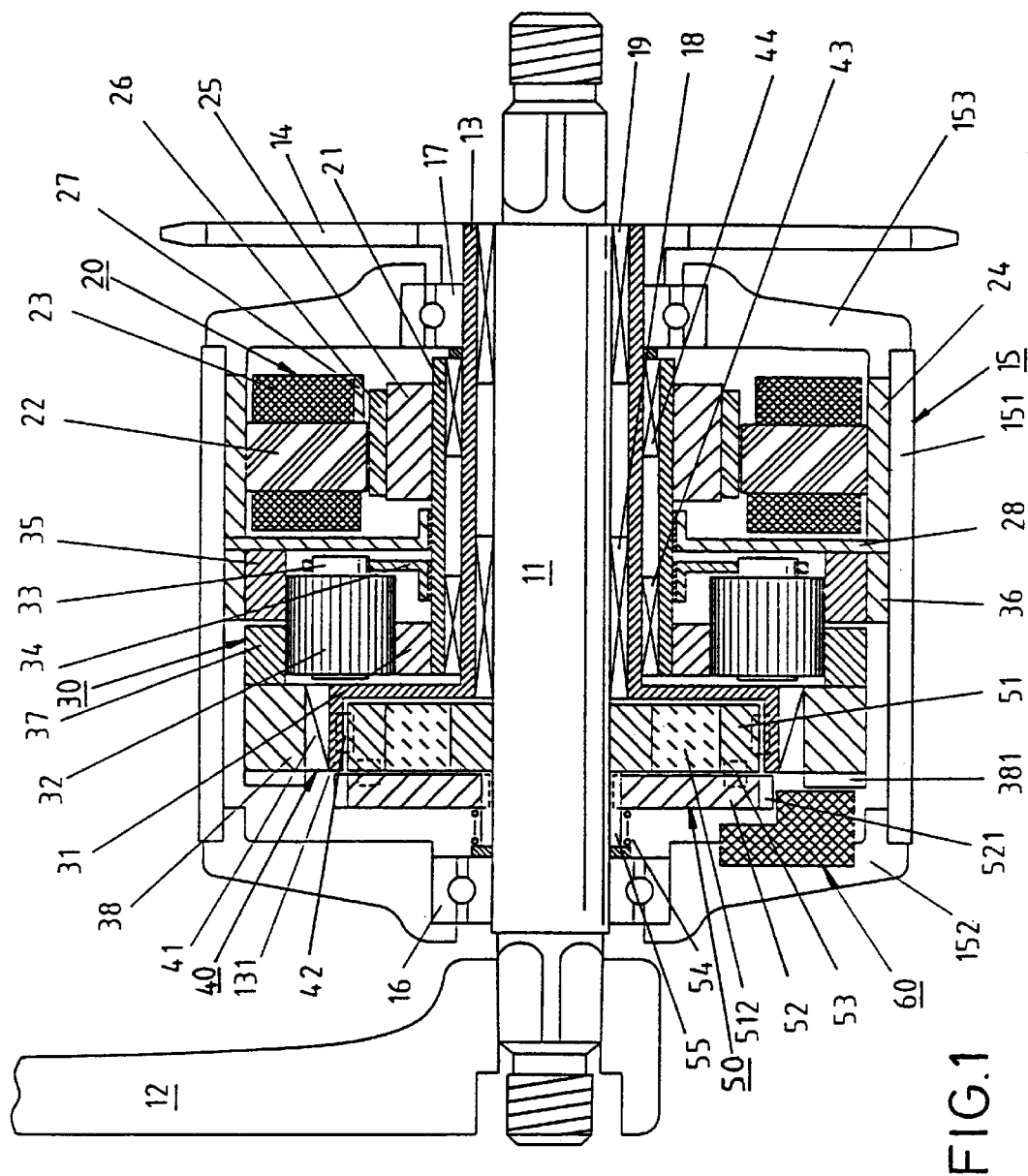
FIG. 1 is a sectional view of a power transmission and pedal force sensing system in accordance with the present invention.
Figure 2:
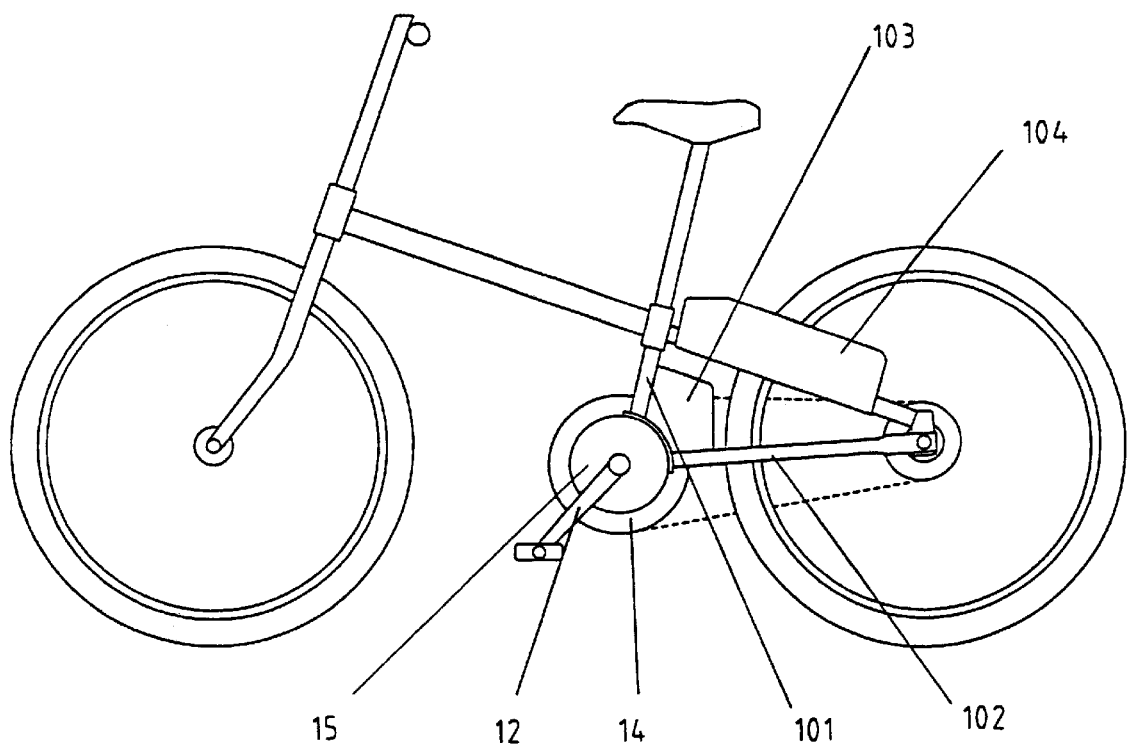
FIG. 2 is a schematic side view illustrating an electric bicycle equipped with the power transmission and pedal force sensing system of the present invention.

Referring to FIGS. 1 and 2, a power transmission and pedal force sensing system for an electric bicycle in accordance with the present invention generally includes a casing 15, an electric motor 20, a gear reduction train 30, a power combination mechanism 40, a pedal force sensing mechanism 50, and a sensor means 60.

The casing 15 is mounted between a seat tube 101 and a chain stay 102 of an electric bicycle (FIG. 2). The casing 15 includes a main casing part 151, a left casing part 152, and a right casing part 153. As shown in FIG. 1, a crankshaft 11 of the bicycle extends through the casing 15 and is rotatably supported by a bearing 16 at the left casing part 152. A hollow axle 13 of a chain wheel 14 is rotatably mounted around the crankshaft 11 by bearings 18 and 19. The hollow axle 13 includes an enlarged disc-like hollow end 131 retained in the casing 15, and the other end of the hollow axle 13 extends beyond the right casing part 153, connects with the chain wheel 14, and is supported by a bearing 17 in the right casing part 153. A motor hollow shaft 21 is mounted around the hollow axle 13 via two bearings 43 and 44, and the electric motor 20 and the gear reduction train 30 are mounted around the motor hollow shaft 21. In a space (not labeled) inside the enlarged end 131 of the hollow axle 13, the pedal force sensing mechanism 50 is mounted to the crankshaft 11. In addition, the power combination mechanism 40 is mounted to an inner periphery and an outer periphery of the enlarged end 131 of the hollow axle 13, which will be described in detail later.

The electric motor 20 includes the hollow motor shaft 21, a stator comprising a silicon-steel plate 22 and a coil 23, a rotor 25, a permanent magnet 26, and a sensor 27 for detecting angular position of the rotor 25. The rotor 25 is rotatably mounted to a right portion of the motor hollow shaft 21. The silicon-steel plate 22 is secured to an inner periphery of the main casing part 151 via a supporting block 24.

The gear reduction train 30 includes a sun gear 31, a planetary gear 32, a planetary gear shaft 33, a fixed ring gear 35, and a rotatable ring gear 37. Preferably, the gear reduction train 30 is a Ferguson's mechanical paradox gear, yet other kinds of gear reduction trains can be used.

The input sun gear 31 is mounted around the motor hollow shaft 21 and acts as an input gear. The planetary gear 32 supported by the planet gear shaft 33 and a supporting arm 31 meshes with and revolves round the sun gear 31. The fixed ring gear 35 meshes with the planetary gear 32 and is secured to the inner periphery of the main casing part 151 by a supporting block 36. The rotatable ring gear 37 meshes with the planetary gear 32 and acts as an output gear. The rotatable ring gear 37 is mounted adjacent to the fixed ring gear 35, and the difference between the numbers of teeth respectively of the two ring gears 35 and 37 is relatively small. For example, if the fixed ring gear 35 has forty (40) teeth and the rotatable ring gear 37 has thirty-eight (38) teeth, when one of the teeth of one of the two ring gears 35 and 37 (e.g., the ring gear 35) aligns one of the teeth of the other of the two ring gears 35 and 37 (e.g., the ring gear 37), the two teeth respectively next to the above-mentioned two teeth of the ring gears 35 and 37 only have a deviation of one-twentieth of a pitch therebetween. Thus, when the planetary gears 32 meshed with the fixed ring gear 35 revolves round the sun gear 31, the rotatable ring gear 37 is moved by one-twentieth of a pitch when the planetary gear 32 travels from one tooth to the next tooth of the fixed ring gear 35. When the planetary gear 32 revolves through 180°, the rotatable ring gear 37 travels through one (1) pitch. Accordingly, the gear reduction ratio of the rotational speed of the planetary gear shaft 33 to the rotational speed of the rotatable ring gear 37 is twenty (20). As a result, a high gear reduction ratio can be obtained when further taking the gear reduction ratio between the sun gear 31 and the planetary gear shaft 33 into consideration.

Figure 3:
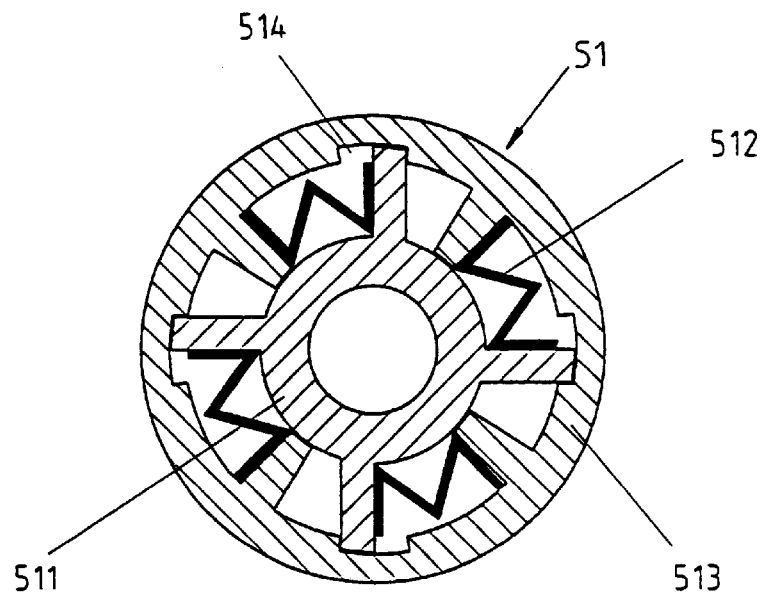
FIG. 3 is a sectional view of a pedal force transmitting sleeve of a pedal force transmitting mechanism of the present invention.
Figure 4:
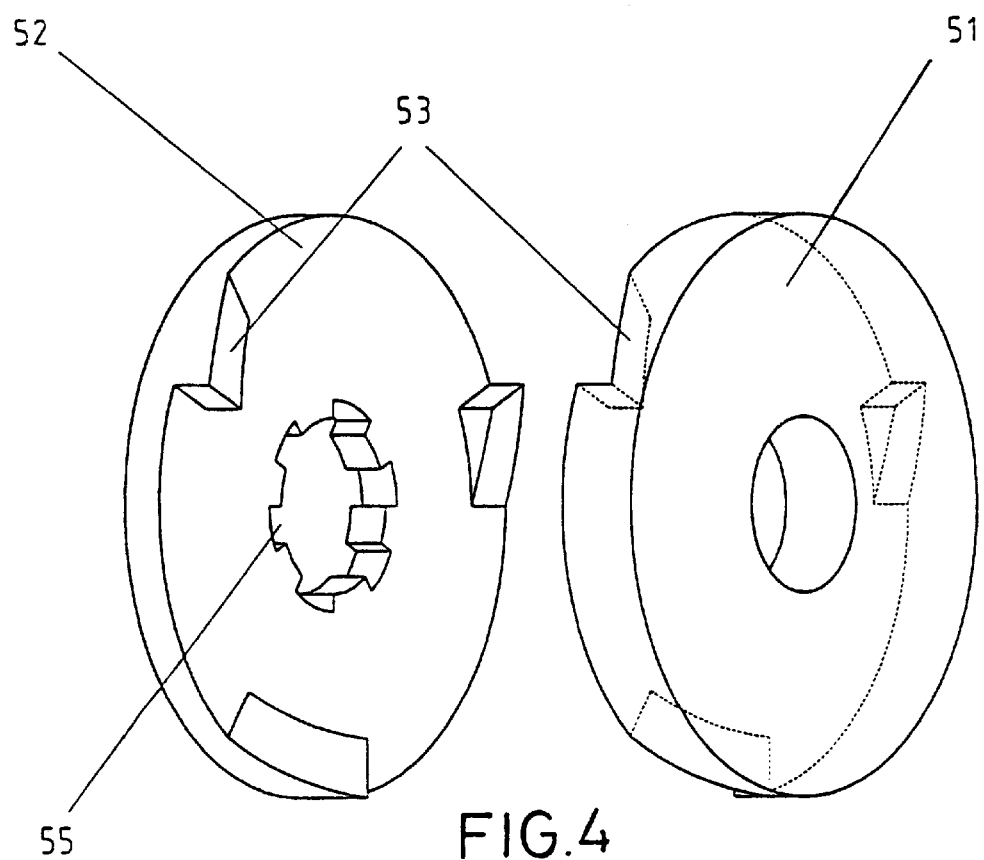
FIG. 4 is an exploded perspective view of the pedal force transmitting mechanism.

Referring to FIG. 4, the pedal force transmitting mechanism 50 includes a pedal force transmitting sleeve 51 and a pedal force sensing sleeve 52. As shown in FIG. 1, the pedal force transmitting mechanism 50 is mounted in a space encircled by the enlarged end 131 of the hollow axle 13 and the left casing part 152, in which the pedal force transmitting sleeve 51 is securely mounted on the crankshaft 11. As shown in FIG. 3, the pedal force transmitting sleeve 51 includes a rigid inner ring 511, a rigid outer ring 513, and an elastic means (e.g., four elastic members 512) sandwiched between the inner ring 511 and the outer ring 513. Each elastic member 512 is preferably a W-shaped spring steel plate, yet elastic members of other material and shapes can be used. The elastic members 512 are deformed when the inner ring 511 and the outer ring 513 are respectively subjected to torque in opposite directions such that relative angular displacement between the inner ring 511 and the outer ring 513 occurs. In addition, restraining grooves 514 are provided in the outer ring 513 to avoid excessive relative angular displacement to thereby prevent from damage to the elastic members 512 due to excessive deformation resulting from a relatively large pedal force. The pedal force sensing sleeve 52 is securely mounted on the crankshaft 11 by a square key groove 55 defined in a center thereof A side of the pedal force sensing sleeve 52 is biased by a return spring 54

(FIG. 1), while the other side of the pedal force sensing sleeve 52 contacts with the outer ring 513 of the pedal force transmitting sleeve 51. In this embodiment, plane cams 53 are provided on the other side of the pedal force sensing sleeve 52 that faces the pedal force transmitting sleeve 51, as shown in FIG. 4. The angular position of the pedal force sensing sleeve 52 is the same as that of the inner ring 511 of the pedal force transmitting sleeve 51. As a result, the relative angular displacement between the inner ring 511 and the outer ring 513 is identical to that between the pedal force sensing sleeve 52 and the outer ring 513 of the pedal force transmitting sleeve 51. When there is a relative angular displacement between the two sleeves 51 and 52, the pedal force sensing sleeve 52 is moved axially under the action of the plane cams 53. The relative angular displacement is detected by the sensor means 60 (preferably of a proximity type), and a voltage signal representing the magnitude of the pedal force is sent out.

Figure 5:
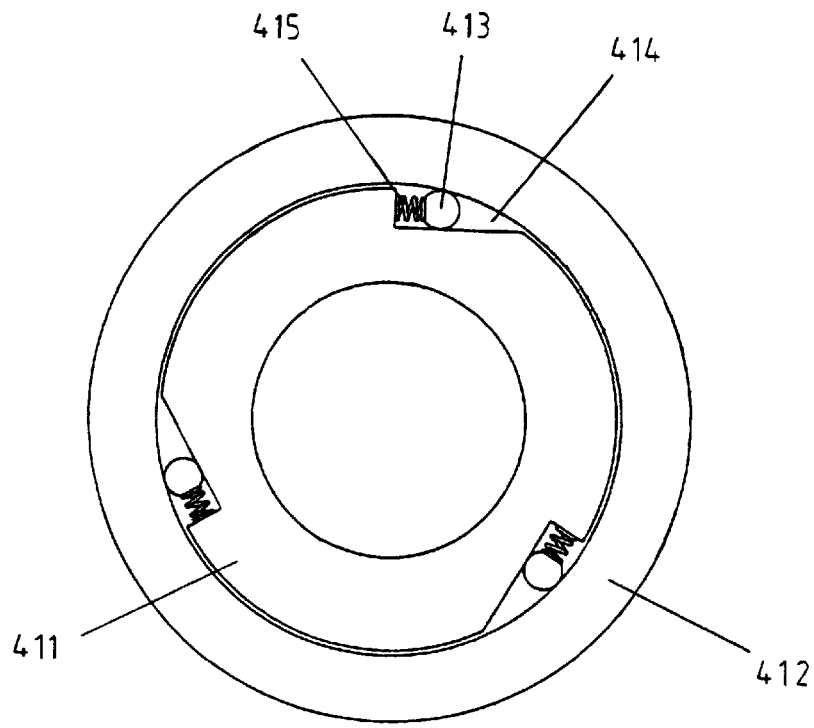
FIG. 5 is a schematic view of a bearing type single direction clutch.

The power combination mechanism 40 includes a first single direction clutch 41, a second single direction clutch 42, and the hollow axle 13 for the chain wheel 14. As shown in FIG. 5, the first clutch 41 may be of a single direction bearing type that includes an inner disc 411, an outer disc 412, and a number of rollers 413. The inner disc 411 includes spaced grooves each of which cooperates with the outer disc 412 to define a wedge-like chamber 414 for receiving a roller 413 therein. When the outer disc 412 rotates clockwise relative to the inner disc 411, each roller 413 moves toward the relatively wide area of the associated chamber 414 and thus cannot connect the inner disc 411 with the outer disc 412. Namely, the first clutch 41 is in a disengaged status. To the contrary, when the outer disc 412 rotates counterclockwise relative to the inner disc 411, each roller 413 moves toward the relatively narrow area of the associated chamber 414 and thus connects the inner disc 411 with the outer disc 412. Namely, the first clutch 41 is in an engaged status as the inner disc 411 and the outer disc 412 move together. The first single direction clutch 41 is mounted to the outer periphery of the enlarged end 131 of the hollow axle 13, wherein the inner disc 411 of the clutch is secured to the enlarged end 131 of the hollow axle 13. In addition, the rotatable ring gear 37 of the gear reduction train 30 is securely mounted around the outer disc 412 via a lateral connecting block 38 (FIG. 1).

Figure 6:
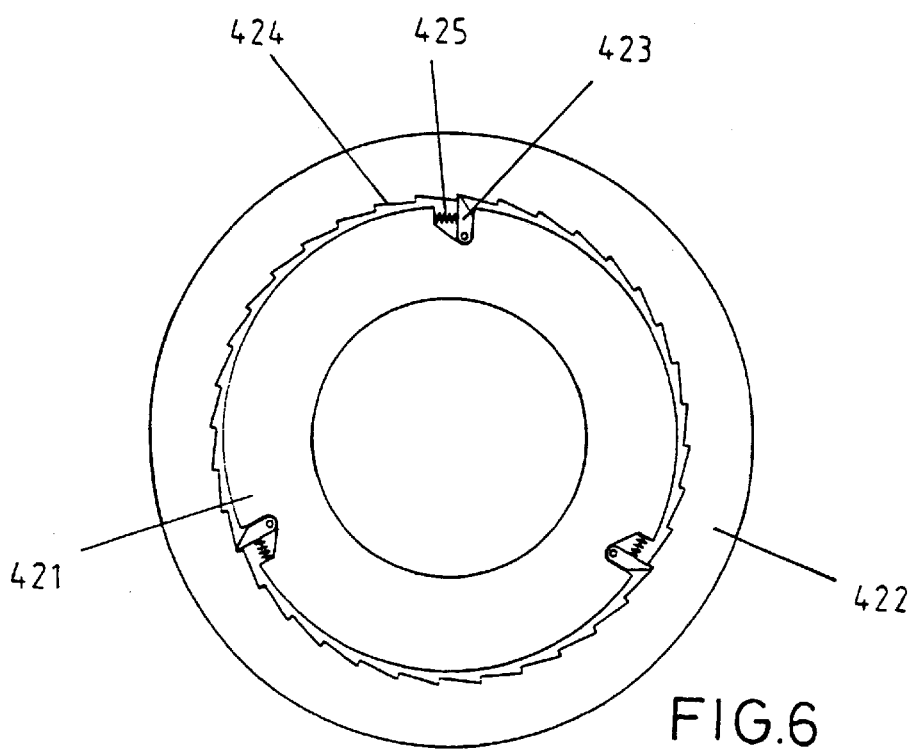
FIG. 6 is a schematic view of a ratchet/pawl type single direction clutch.

FIG. 6 illustrates an embodiment of the second single direction clutch 42. The second single direction clutch 42 includes an inner disc 421 and an outer disc 422. A ratchet wheel 424 is provided on an inner periphery of the outer disc 422. A number of grooves (not labeled) are defined in an outer periphery of the inner disc 421 and each include therein a pawl 423 biased by a spring 425 for releasably engaging with the ratchet wheel 424 of the outer disc 422. When the outer disc 422 rotates counterclockwise relative to the inner disc 421, each pawl 423 is moved inwardly by the outer disc 422 and thus cannot connect the inner disc 421 with the outer disc 422. Namely, the second clutch 42 is in a disengaged status. To the contrary, when the outer disc 422 rotates clockwise relative to the inner disc 421, each pawl 423 is engaged with the ratchet wheel 424 of the outer disc 422 and thus connects the inner disc 421 with the outer disc 422. Namely, the second clutch 42 is in an engaged status as the inner disc 421 and the outer disc 422 move together.

As shown in FIG. 1, the second single direction clutch 42 is engaged with the inner periphery of the enlarged end 131 of the hollow axle 13, in which the outer disc 422 is connected to the inner periphery of the enlarged end 131 of the hollow axle 13. The outer ring 513 of the pedal force transmitting sleeve 51 of the pedal force sensing mechanism 50 is connected to the inner ring 421 of the second clutch 42. Still referring to FIG. 1, again, the first single direction clutch 41 and the second single direction clutch 42 are disposed to the outer periphery and the inner periphery of the enlarged end 131 of the hollow axle 13, respectively, and are located on the same line in radial direction.

When cycling, if the rotational speed of the crankshaft 11 is higher than that of the motor after gear reduction (i.e., the speed of the rotatable ring gear 37), the pedal force transmitting sleeve 51 drives the hollow axle 13 of the chain wheel 13 under the action of the second single direction clutch 42, yet the hollow axle 13 does not drive the rotatable ring gear 37 and the connecting block 38 under the action of the first single direction clutch 41. At this time, the pedal force solely drives the chain wheel 14 and the bicycle frame. In the mean time, the inertia of the elements of the electric motor 20 shall not become a burden to pedaling.

If the rotational speed of the crankshaft 11 is lower than that of the rotatable ring gear 37, the hollow axle 13 drives the rotatable ring gear 37 under the action of the first single direction clutch 41, yet the hollow axle 13 of the chain wheel 13 does not drive the pedal force transmitting sleeve 51 and the crankshaft 11 under the action of the second single direction clutch 42. At this time, the power of the electric motor 20 solely drives the chain wheel 14 and the bicycle frame. In the mean time, the inertia of the crankshaft 11 shall not become a burden to the power of the electric motor 20, and the pedals of the bicycle shall not be forcibly driven by the electric motor 20.

If the rotational speed of the crankshaft 11 is equal to that of the rotatable ring gear 37, the pedal force transmitting sleeve 51 and the rotatable ring gear 37 together drive the hollow axle 13 under the action of the first and second single direction clutches 41 and 42. At this time, the pedal force and the power of the electric motor 20 are combined at the hollow axle 13 and together drive the chain wheel 14 and the bicycle frame.

Figure 7A:
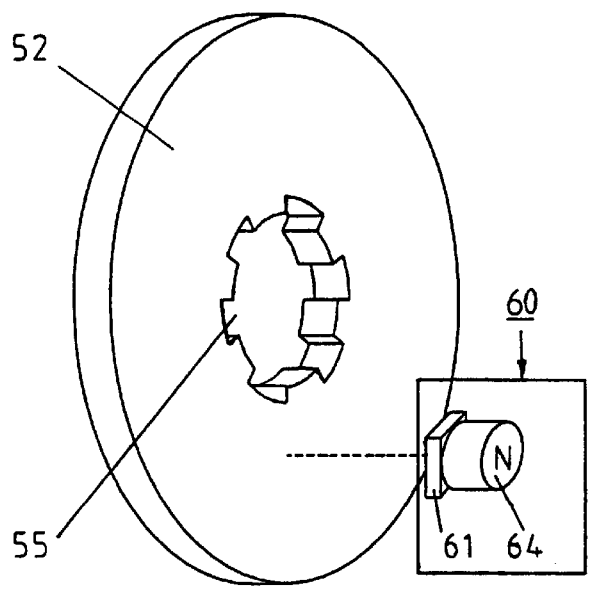
FIG. 7a is a schematic view of the pedal force sensing sleeve and an analog type Hall element.
Figure 7B:
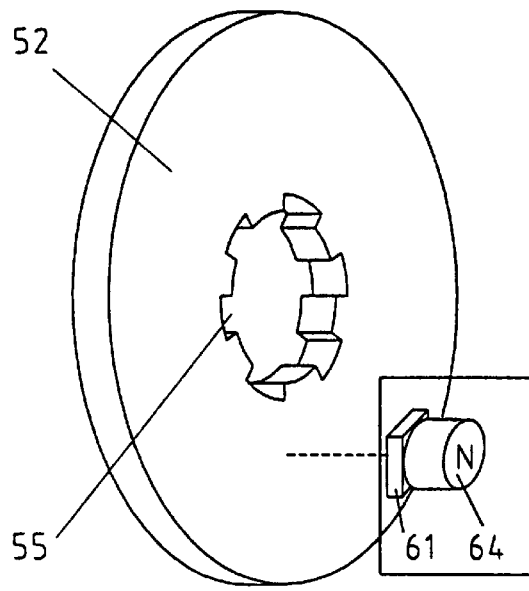
FIG. 7b is a view similar to FIG. 7a, wherein the Hall element is closer to the pedal force sensing sleeve.

The sensor means 60 may include an analog output type Hall element 61 (FIGS. 7a and 7b) for sensing pedal force, a digital output type Hall element 62 (FIGS. 9a, 9b, and 9c) for sensing rotational speed of the pedals, and a Hall element 63 (FIGS. 9a, 9b, and 9c) for sensing rotational speed of the electric motor 20, each Hall element 61, 62, 63 having a biased permanent magnet 64, 65, 66 mounted to a rear side thereof As shown in FIG. 7a, the Hall element 61 for sensing pedal force faces the pedal force sensing sleeve 52. When the pedal force is small, the magnetic-flux-density of the magnetic lines of the magnet 64 that pass through the Hall element 61 is small such that the Hall element 61 outputs a voltage signal of a low value (e.g., 1 volt, see FIG. 8a). When the pedal force is larger, the pedal force sensing sleeve 52 is moved to a location closer to the Hall element 61. As a result, the magnetic-flux-density of the magnetic lines of the magnet 64 that pass through the Hall element 61 is larger such that the Hall element 61 outputs a voltage signal of a high value (e.g., 5 volt, see FIG. 8b).

Figure 9A:
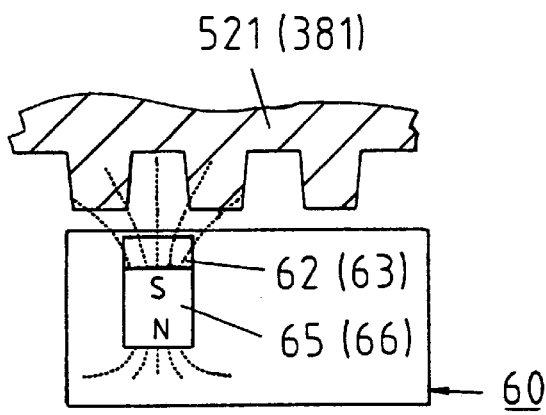
FIGS. 9a, 9b, and 9c are schematic views illustrating operation of the pedal force sensing sleeve and a digital type Hall element.
Figure 10A:
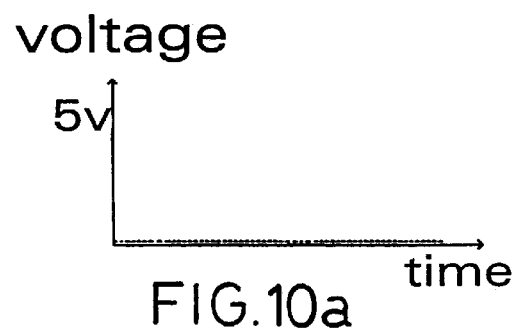
FIGS. 10a, 10b, and 10c are voltage/time diagrams corresponding to outputs of the digital type Hall element in FIGS. 9a to 9c, respectively.
Figure 9B:
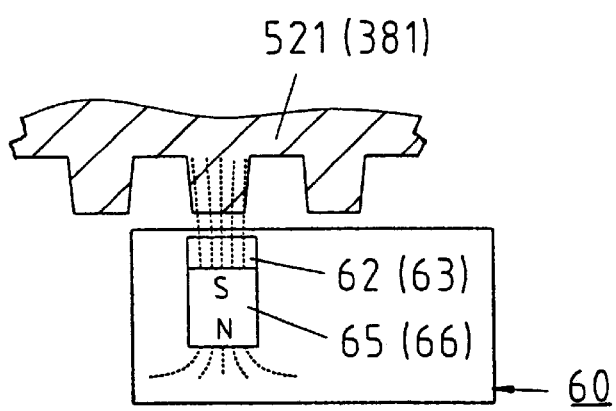
Figure 10B:
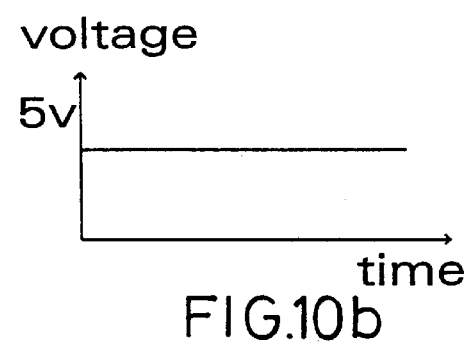
Figure 9C:
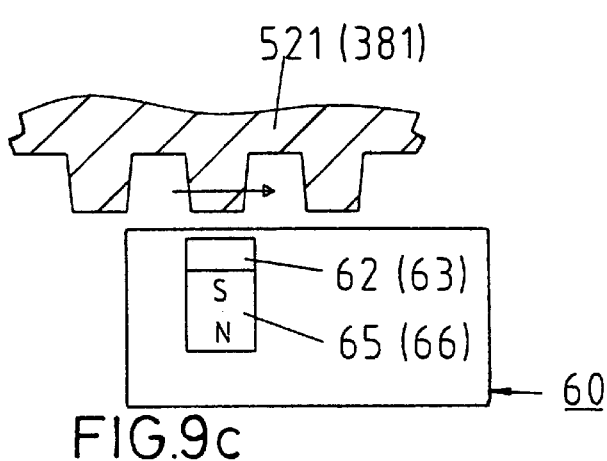
Figure 10C:
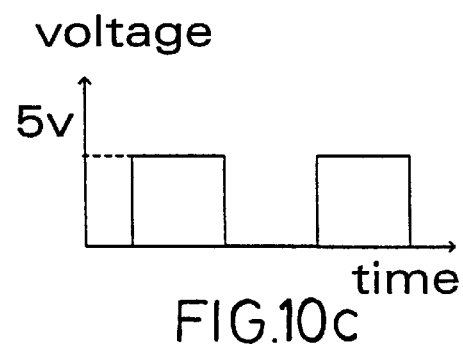

Referring to FIG. 9a, the Hall element 62 for sensing rotational speed of the pedals faces outer teeth 521 (for sensing rotational speed of pedals) formed on an outer periphery of the pedal force sensing sleeve 52. When the tooth root passes through the Hall element 62 (FIG. 9a), the magnetic-flux-density of the magnetic lines of the magnet 65 that pass through the Hall element 62 is small such that the output voltage signal of the Hall element 62 is low (the logical output is '0', see FIG. 10a). When the tooth crest passes through the Hall element 62 (FIG. 9b), the magnetic-flux-density of the magnetic lines of the magnet 65 that pass through the Hall element 62 is greater such that the output voltage signal of the Hall element 62 is high (the logical output is '1', see FIG. 10b). The resultant output voltage signal of the Hall element 62 corresponding to rotational movement of the pedal force sensing sleeve 52 (FIG. 9c) is shown in FIG. 10c. The higher the rotational speed of the pedals, the higher the frequency of the impulse signals in FIG. 10c.

Still referring to FIG. 9a, the Hall element 63 for sensing rotational speed of the electric motor 20 faces peripheral teeth 381 (for sensing rotational speed of the electric motor 20) formed on a side of the connecting block 38 for the rotational ring gear 37. When the tooth root passes through the Hall element 63 (FIG. 9a), the magnetic-flux-density of the magnetic lines of the magnet 66 that pass through the Hall element 63 is small such that the output voltage signal of the Hall element 63 is low (the logical output is '0', see FIG. 10a). When the tooth crest passes through the Hall element 63 (FIG. 9b), the magnetic-flux-density of the magnetic lines of the magnet 66 that pass through the Hall element 66 is greater such that the output voltage signal of the Hall element 63 is high (the logical output is '1', see FIG. 10b). The resultant output voltage signal of the Hall element 63 corresponding to rotational movement of the peripheral teeth 381 of the connecting block 38 (FIG. 9c) is shown in FIG. 10c. The higher the rotational speed of the electric motor 20, the higher the frequency of the impulse signals in FIG. 10c.

Figure 11:
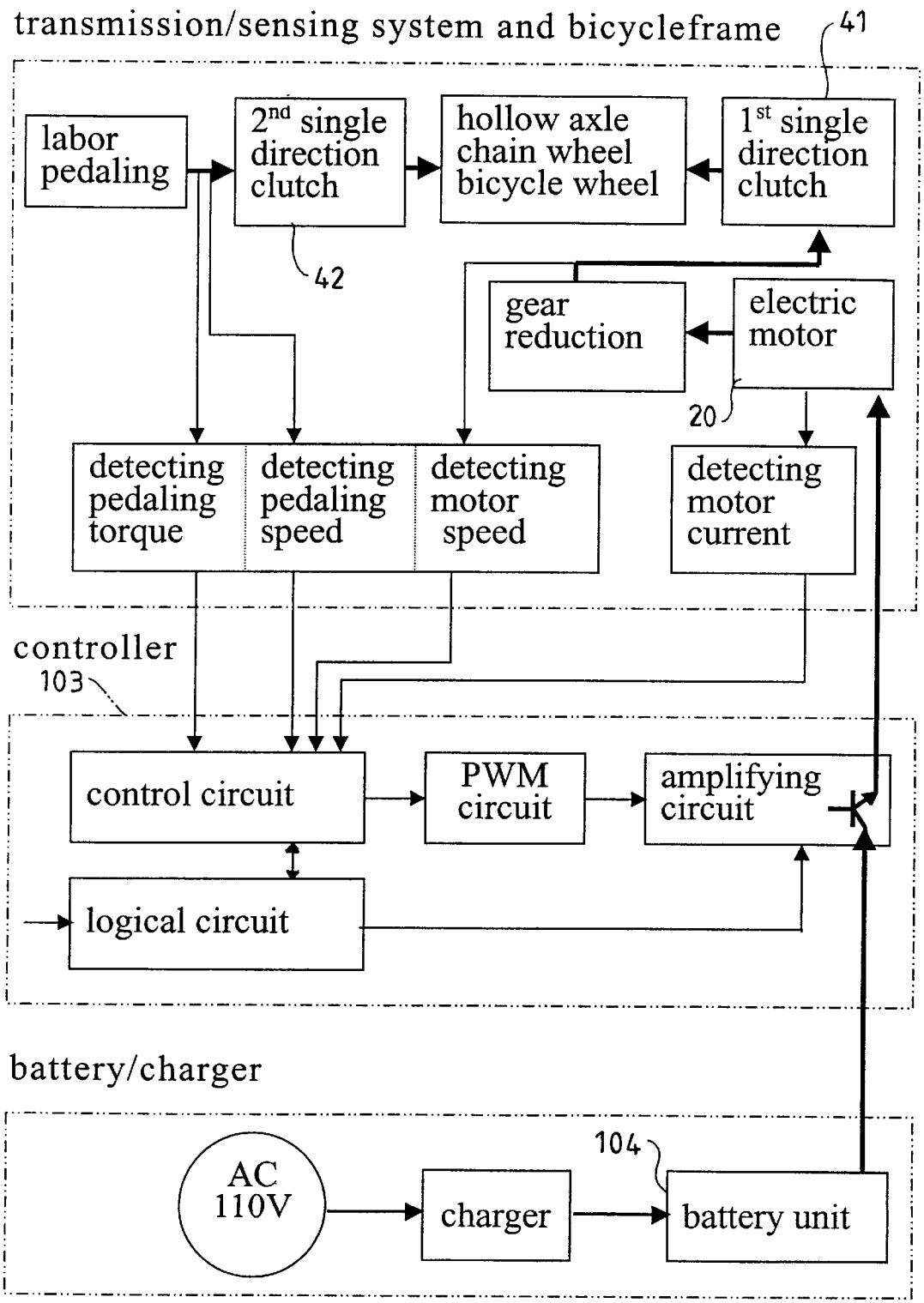
FIG. 11 is a block diagram illustrating operation principle of the present invention.

Operational principle of the present invention will be described in detail with reference to FIGS. 1 and 11. When cycling, the pedal force is transmitted to the hollow axle 13 via the crankshaft 11, the pedal force transmitting sleeve 51, and the second single direction clutch 42, thereby driving the chain wheel 14 and the bicycle frame. In the mean time, the pedal force also causes axial displacement of the pedal force sensing sleeve 52 such that the sensor means 60 outputs an analog voltage signal representing the magnitude of the pedal force, a first digital logic signal representing rotational speed of the pedals, and a second digital logic signal representing rotational speed of the electric motor 20 to a controller 103 (FIG. 1). The controller 103 calculates proportion of the auxiliary power corresponding to the rotational speed of the pedals represented by the first digital logic signal. Then, the detected pedal force value is multiplied by the proportion value of the auxiliary power and thus obtains a command value for the auxiliary power. Thereafter, the voltage command for the electric motor 20 and relative pulse width modulating factor are calculated when taking the rotational speed of the electric motor 20 into consideration. A time ratio for controlling rapid opening/closing of power transistors can thus be controlled. The pulse width modulating signal decides electricity from the battery unit 104 (FIG. 1) to the electric motor 20. Thus, the electric motor 20 may output a proper torque as an auxiliary power that is transmitted to the hollow axle 13 via the motor hollow shaft 21, the gear reduction train 30, and the first single direction clutch 41.

Again, when the rotational speed of the pedals is higher than the rotational speed of the electric motor 20 after gear reduction, the first single direction clutch 41 is in a disengaged status while the second single direction clutch 42 is in an engaged status such that the pedal force solely drives the chain wheel 14 and the bicycle frame. When the rotational speed of the pedals is lower than the rotational speed of the electric motor 20 after gear reduction, the first single direction clutch 41 is in an engaged status while the second single direction clutch 42 is in a disengaged status such that the power of the electric motor 20 solely drives the chain wheel 14 and the bicycle frame. When the rotational speed of the pedals is equal to the rotational speed of the electric motor 20 after gear reduction, the first and second single direction clutches 41 and 42 are both in an engaged status such that the pedal force and the power of the electric motor 20 together drive the chain wheel 14 and the bicycle frame.

According to the above description, the power transmission and pedal force sensing device of the present invention includes the following advantages:

1. The power transmission path is shortened, and the transmission efficiency is improved.
2. Frictional wear to the pedal force sensing elements is eliminated, as the pedal force sensing elements are not located on the pedal force transmission path.
3. The overall volume is small and the overall weight is low as the electric motor is mounted in the casing.

Although the invention has been explained in relation to its preferred embodiment, it is to be understood that many other possible modifications and variations can be made without departing from the spirit and scope of the invention as hereinafter claimed.

What is claimed is:

1. A power transmission system for an electric motor having a rotor and a stator, comprising:
    a casing,
    a crankshaft adapted for attachment to pedals and extending through the casing,
    a hollow axle mounted around the crankshaft and including a first end in the casing and a second end extending beyond the casing and adapted to be securely connected to a chain wheel to rotate therewith,
    a motor hollow shaft mounted around the hollow axle, the crankshaft, the hollow axle and the motor hollow shaft being concentrically arranged in sequence, wherein the rotor is adapted to be mounted around an end of the motor hollow shaft and the stator is adapted to be fixed to an inner periphery of the casing,
    a gear reduction train mounted to the end of the motor hollow shaft, and
    a power combination mechanism for combining pedaling power from the crankshaft and power from the electric motor at the hollow axle to thereby drive the chain wheel.

2. The power transmission system for an electric motor as claimed in claim 1, wherein the hollow axle includes an enlarged hollow end with an inner periphery and an outer periphery, and wherein the power combination mechanism includes a first single direction clutch mounted to the outer periphery of the enlarged hollow end of the hollow axle and connected to the gear reduction train and a second single direction clutch mounted to the inner periphery of the enlarged hollow end of the hollow axle and connected to the crankshaft, the second single direction clutch, the enlarged hollow end of the hollow axle, and the first single direction clutch being arranged on a line in sequence along a radial direction of the crankshaft.

3. The power transmission system for an electric motor as claimed in claim 2, wherein the gear reduction train is a Ferguson's mechanical paradox gear that includes:
    an input sun gear mounted around the motor hollow shaft to rotate therewith,
    a planetary gear meshed with and revolving round the input sun gear, a fixed ring gear meshed with the planetary gear and securely attached to the inner periphery of the casing, and an output rotatable ring gear meshed with the planetary gear and connected to the first single direction clutch of the power combination mechanism via a connecting block, the output rotatable ring gear and the fixed ring gear have a small difference in the numbers of the teeth thereof.

4. The power transmission system of claim 1, further comprising, in combination, said electric motor.

5. A pedal force sensing system for an electric bicycle, comprising:

a crankshaft for pedals, a pedal force transmitting sleeve including an inner ring securely mounted around the crankshaft to rotate therewith, an outer ring surrounding the inner ring, and an elastic member mounted between the inner ring and the outer ring, wherein when the inner ring and the outer ring rotate relative to each other, the elastic member is deformed for generating a relative angular displacement between the inner ring and the outer ring, a pedal force sensing sleeve mounted around the crankshaft and adjacent to the pedal force transmitting sleeve, the pedal force sensing sleeve including a first side and a second side, at least one plane cam provided on the pedal force transmitting sleeve that faces the pedal force sensing sleeve such that when the pedal force sensing sleeve rotates relative to the pedal force transmitting sleeve, the pedal force sensing sleeve has a displacement relative to the crankshaft, and a sensor for sensing the displacement of the pedal force sensing sleeve relative to the crankshaft and outputting a voltage signal representing a magnitude of a pedal force.

6. The pedal force sensing system for an electric bicycle as claimed in claim 5, further comprising a return spring including a first end attached to the first side of the pedal force sensing sleeve and a second end securely attached to the crankshaft.

7. The pedal force sensing system for an electric bicycle as claimed in claim 5, wherein the pedal force sensing sleeve includes a square key groove so as to be securely mounted on the crankshaft.

8. The pedal force sensing system for an electric bicycle as claimed in claim 4, wherein the inner ring and the outer ring of the pedal force transmitting sleeve include at least one restraining groove defined therebetween to avoid excessive relative angular displacement resulting from an excessive pedal force, thereby preventing damage to the elastic member.

9. The pedal force sensing system for an electric bicycle as claimed in claim 5, wherein the sensor includes a first Hall element for sensing magnitude of the pedal force and outputting an analog voltage output, a second Hall element for sensing rotational speed of pedaling and outputting a digital output, and a third Hall element for sensing rotational speed of the electric motor.

10. The pedal force sensing system for an electric bicycle as claimed in claim 5, wherein the sensor is a proximity sensor for detecting the displacement of the pedal force sensing sleeve and outputting a voltage signal representing magnitude of the pedal force.

11. A power transmission and pedal force sensing system for an electric motor having a rotor and a stator, comprising:

a casing, a crankshaft adapted for attachment to pedals and extending through the casing, a hollow axle mounted around the crankshaft and including a first end in the casing and a second end extending beyond the casing and adapted to be securely connected to a chain wheel to rotate therewith, a motor hollow shaft mounted around the hollow axle, the crankshaft, the hollow axle and the motor hollow shaft being concentrically arranged in sequence, wherein the rotor is adapted to be mounted around the end of the motor hollow shaft, and the stator is adapted to be fixed to an inner periphery of the casing, a gear reduction train mounted to the end of the motor hollow shaft, a power combination mechanism for combining pedaling power from the crankshaft and power from the electric motor at the hollow axle to thereby drive the chain wheel, a pedal force transmitting sleeve including an inner ring securely mounted around the crankshaft to rotate therewith, an outer ring surrounding the inner ring, and an elastic member mounted between the inner ring and the outer ring, when the inner ring and the outer ring rotate relative to each other, wherein the elastic member is deformed for generating a relative angular displacement between the inner ring and the outer ring, a pedal force sensing sleeve mounted around the crankshaft and adjacent to the pedal force transmitting sleeve, the pedal force sensing sleeve including a first side and a second side, at least one plane cam provided on the pedal force transmitting sleeve that faces the pedal force sensing sleeve such that when the pedal force sensing sleeve rotates relative to the pedal force transmitting sleeve, the pedal force sensing sleeve has a displacement relative to the crankshaft, and a sensor for sensing the displacement of the pedal force sensing sleeve relative to the crankshaft and outputting a voltage signal representing a magnitude of a pedal force.

12. The power transmission and pedal force sensing system for an electric motor as claimed in claim 11, wherein the hollow axle includes an enlarged hollow end with an inner periphery and an outer periphery, and wherein the power combination mechanism includes a first single direction clutch mounted to the outer periphery of the enlarged hollow end of the hollow axle and connected to the gear reduction train and a second single direction clutch mounted to the inner periphery of the enlarged hollow end of the hollow axle and connected to the crankshaft, the second single direction clutch, the enlarged hollow end of the hollow axle, and the first single direction clutch being arranged on a line in sequence along a radial direction of the crankshaft.

13. The power transmission and pedal force sensing system for an electric motor as claimed in claim 12, wherein the gear reduction train is a Ferguson's mechanical paradox gear that includes:

an input sun gear mounted around the motor hollow shaft to rotate therewith, a planetary gear meshed with and revolving round the input sun gear, a fixed ring gear meshed with the planetary gear and securely attached to the inner periphery of the casing, and an output rotatable ring gear meshed with the planetary gear and connected to the first single direction clutch of the power combination mechanism via a connecting block, the output rotatable ring gear and the fixed ring gear have a small difference in the numbers of the teeth thereof.

14. The power transmission and pedal force sensing system for an electric motor as claimed in claim 11, further comprising a return spring including a first end attached to the first side of the pedal force sensing sleeve and a second end securely attached to the crankshaft.

15. The power transmission and pedal force sensing system for an electric motor as claimed in claim 11, wherein the pedal force sensing sleeve includes a square key groove so as to be securely mounted on the crankshaft.

16. The power transmission and pedal force sensing system for an electric motor as claimed in claim 11, wherein the inner ring and the outer ring of the pedal force transmitting sleeve include at least one restraining groove defined therebetween to avoid excessive relative angular displacement resulting from an excessive pedal force, thereby preventing damage to the elastic member.

17. The power transmission and pedal force sensing system for an electric motor as claimed in claim 11, wherein the sensor includes a first Hall element for sensing magnitude of the pedal force and outputting an analog voltage output, a second Hall element for sensing rotational speed of pedaling and outputting a digital output, and a third Hall element for sensing rotational speed of the electric motor.

18. The power transmission and pedal force sensing system for an electric motor as claimed in claim 11, wherein the sensor is a proximity sensor for detecting the displacement of the pedal force sensing sleeve and outputting a voltage signal representing magnitude of the pedal force.

19. The power transmission and pedal force sensing mechanism of claim 11, further comprising, in combination, said motor.

* * * * *